US006533072B2

United States Patent
Hori

(10) Patent No.: US 6,533,072 B2
(45) Date of Patent: Mar. 18, 2003

(54) FLUID SUPPLY SYSTEM

(75) Inventor: Takeshi Hori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/756,671

(22) Filed: Jan. 10, 2001

(65) Prior Publication Data

US 2001/0008194 A1 Jul. 19, 2001

(30) Foreign Application Priority Data

Jan. 17, 2000 (JP) ........................................ 2000-007611

(51) Int. Cl.[7] ................................................. F01M 1/10
(52) U.S. Cl. ...................................... 184/6.25; 210/222
(58) Field of Search ............................... 184/6.16, 6.24, 184/6.25

(56) References Cited

U.S. PATENT DOCUMENTS 4,372,852 A * 2/1983 Kovacs ........................ 210/222
4,813,294 A * 3/1989 Ukai et al. ................. 74/388 PS
4,839,044 A * 6/1989 Tomita ........................ 210/222
5,005,437 A * 4/1991 Furer et al. .................... 74/467
5,372,490 A * 12/1994 Fain ............................ 418/55.6
5,865,607 A * 2/1999 Fukuoka ....................... 418/46

FOREIGN PATENT DOCUMENTS

| JP | 6-6896 | 1/1994 |
| JP | 6-159484 | 6/1994 |
| JP | 8-303434 | 11/1996 |
| JP | 10-85523 | 4/1998 |
| JP | 11-290715 | 10/1999 |

* cited by examiner

Primary Examiner—David A. Bucci
Assistant Examiner—Timothy McAnulty
(74) Attorney, Agent, or Firm—Armstrong, Westerman & Hattori, LLP

(57) ABSTRACT

A fluid supply system is constructed to have an oil ontainer 21, a transmission device 13 subjected to the supply of lubricating oil from the oil container, a lubricating oil supply tube 22 introducing lubricating oil from the oil container 21 to the transmission device 13, first and second axial holes 16a, 16b and lubricating holes 17. In the fluid supply system, a filtering member F having a permanent magnet and formed into a cylindrical shape is disposed in the first axial hole 16a formed so as to extend axially in a transmission input shaft 15, whereby at least a part of a lubricating oil supply passage is constituted by the first and second axial holes 16a, 16b and the lubricating holes 17 in the transmission input shaft 15, and the internal cylindrical space of the filtering member F.

7 Claims, 8 Drawing Sheets

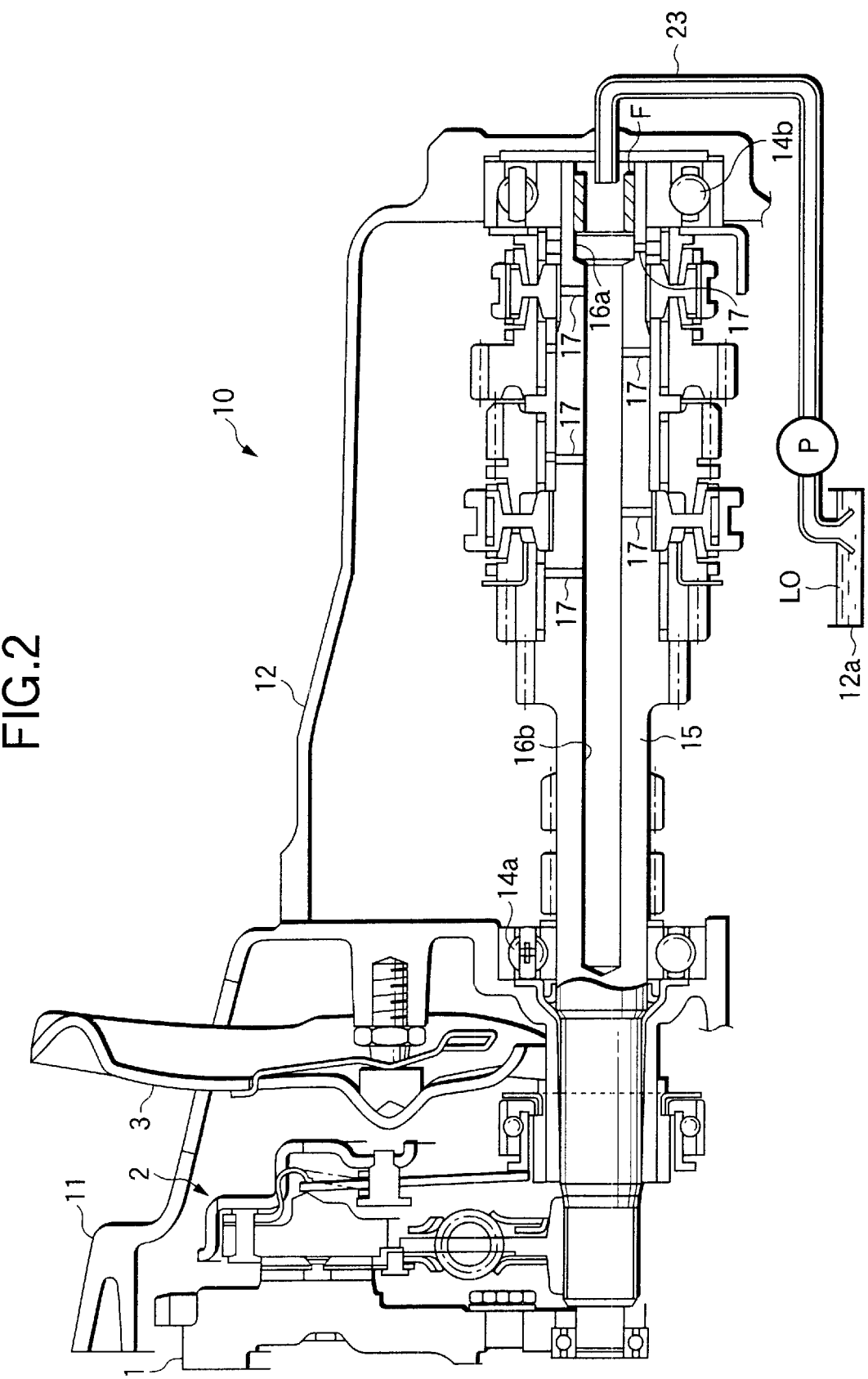

FIG.10A
FIG.10B
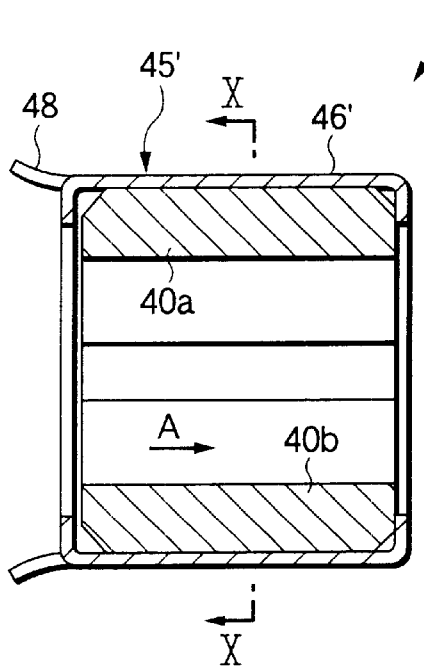
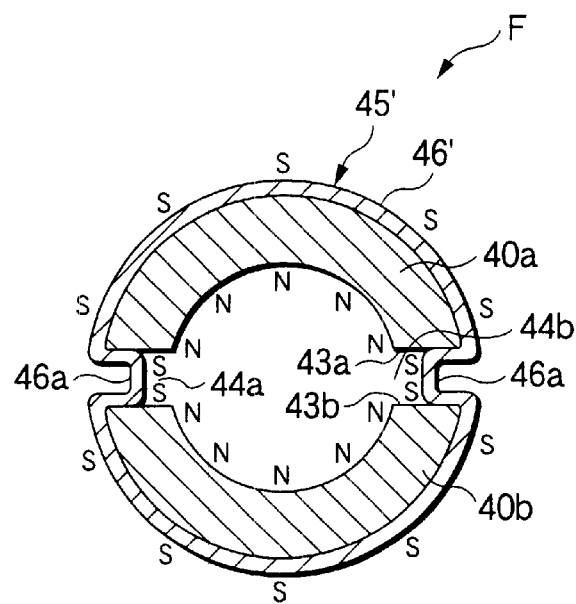

FLUID SUPPLY SYSTEM

BACKGROUND OF THE INVENTION

1. Field of the Invention

The present invention relates to a fluid supply system for supplying working fluid or lubricating oil to an operating device such as a transmission system, and more particularly to a fluid supply system in which a fluid passage for carrying the fluid or oil is formed through a rotating shaft.

2. Description of the Related Art

A power transmission device such as a transmission or a differential (a final reduction gear unit) is constituted by gears, clutches and bearings which are disposed on a rotating shaft which transmits a rotation driving force. And, lubricating oil for lubricating the gears, clutches and bearings, and clutch hydraulic operating fluid for operating the clutches are supplied to the gears, bearings and clutches through oil and fluid passages constituted by axial holes formed so as to axially extend in the rotating shaft. In the power transmission device, it is highly likely that metal friction particles generated from the gears, clutches, bearings, shaft and the like during the operation of the device enter and mix with the oil and fluid. In the event that the lubricating oil and hydraulic operating fluid containing the metal friction particles continue to be used as the lubricating oil and hydraulic operating fluid, there may be caused a risk that the abutment portions and contact portions of the gears, bearings and clutches are worn by the metal friction particle contained in the oil and fluid.

To cope with the problem, it is known that an oil filter having a filtering paper or a strainer having a metal screen is used to remove the dirt contained in lubricating oil or hydraulic operating fluid (for example, JP-A-6-159484 and JP-A-10-85523). Among the dirt contained in the oil or fluid, iron particles have the worst affect on the constituent components of the power transmission device, and therefore, a permanent magnet is often disposed within a transmission case, an oil tank, or an oil pan for the purpose of removing those iron particles. For example, the disposition of a permanent magnet at a drain plug is disclosed in JP-A-6-6896, JP-A8-303434, JP-A-11-290715.

By selecting filtering materials, the filtering accuracy of an oil filter and a strainer can be increased, but this causes problems that the higher the filtering accuracy, the higher the flow path resistance, that the production cost is increased, and that the power transmission device has to become large in size. In addition, the method of disposing the permanent magnet in the interior of the transmission case or the like makes the construction of the transmission device simple and reduces the production cost thereof, but all the oil and fluid do not always pass through in the vicinity of the permanent magnet, and therefore, there is caused a problem that the metal particle removing efficiency is reduced.

SUMMARY OF THE INVENTION

The invention was made in view of the above problems, and an object thereof is to provide a fluid supply system which is simple in construction and small in size and which can supply clean fluid by efficiently removing iron particles contained in the fluid.

With a view to attaining the object, according to the invention, there is provided a fluid supply system having a fluid supply source (for example, an oil container 21, a hydraulic pump P or a lubricating oil pump 77 in an embodiment of the invention), an operating device (for example, a transmission device 13 of a transmission 10, bearings 711, 71b, 78a, 78b of a final drive FD, differential clutches 75a, 756b or the like in the embodiment) receiving a fluid supply from the fluid supply source and a fluid supply passage (for example, lubricating oil supply tubes 22, 23, first and second axial holes 16a, 16b, a lubricating hole 17, first to fourth lubricating holes 84a to 84d, a fifth lubricating hole 80, lubricating portions 81a, 81b, sixth lubricating holes 82a, 82b, seventh lubricating holes 83a, 83b or the like in the embodiment) extending from the fluid supply source to the operating device. The fluid supply system further has a rotating shaft (for example, a transmission input shaft 15, a pinion gear 72 or an output shaft in the embodiment), and in the fluid supply system, a filtering member (for example, filtering members F, F1, F2 in the embodiment) is disposed which is formed into a cylindrical configuration and has a permanent magnet disposed within an axial hole (for example, a first axial hole 16a, the first lubricating hole 84a, or the lubricating portions 81a, 81b in the embodiment) formed so as to extend axially within the rotating shaft, and at least a part of the fluid supply passage is constituted by the axial hole within the rotating shaft and a cylindrical internal space formed within the filtering member.

Where the fluid supply system constructed as described above is used, as at least the part of the fluid supply passage is formed by the cylindrical internal space of the filtering member, all the fluid supplied from the fluid supply source to the operating device through the fluid supply passage passes through the cylindrical internal space of the filtering member, when iron particles are attracted by the permanent magnet constituting the filtering member so as to adhere thereto, whereby the iron particles are removed from the fluid in an efficient fashion. Furthermore, since the filtering member is disposed in the rotating shaft and rotates together with the rotating shaft, a centrifugal force produced when the rotating shaft rotates acts on the fluid passing through the cylindrical internal space of the filtering member. When this happens, since the specific gravity of the iron particles contained in the fluid is greater than that of the fluid, the iron particles on which the centrifugal force is acting are then caused to move toward an outer circumferential side of the space and hence to approach the permanent magnet and eventually adhere to the permanent magnet to thereby be removed in a more effective fashion.

Furthermore, it is preferable that the fluid supply system is constructed such that at least a pair of groove portions (for example, groove portions 33, 34, 44a, 44b, 54, 64a, 64b in the embodiment) is formed in a cylindrical inner surface of the filtering member in such a manner as to be positioned diametrically across a central axis of the filtering member and to extend in an axial direction, so that the magnetic flux of the permanent magnet converges in the pair of groove portions. According to this construction, the iron particles can be collected into the groove portions so as to adhere thereto for efficient removal from the fluid. Furthermore, it is preferable that downstream portions in a fluid flow direction of the pair of groove portions are dammed (for example, bent portions 39a, 49a in the embodiment) so as to form fluid reservoirs (for example, bag-like spaces 33a, 34a in the embodiment) on a downstream side of the groove portions. According to this construction, it is unlikely that the iron particles adhering to the interior of the groove portions formed into the fluid reservoirs are forced to separate therefrom by the flow of the fluid so as to flow thereout toward a downstream side of the flow, and moreover, since the flow of the fluid tends to stagnate in the fluid reservoir portions, the iron particles can be caused to adhere to the permanent magnet in a more effective fashion.

In addition, the invention may be constructed such that a rotating speed regulating means (for example, an engine in the embodiment) is provided for regulating the rotating speed of the rotating shaft, so that the rotating speed regulating means regulates the rotating speed of the rotating shaft in such a manner as to increase the rotating speed of the rotating shaft in response to an increase in volume of the fluid supplied from the fluid supply source (for example, the hydraulic pump P in the embodiment). Increasing the rotating speed of the rotating shaft increases the centrifugal force acting on the fluid flowing through the interior of the rotating shaft, and this causes the iron particles in the fluid to move toward the outer circumferential side of the rotating shaft so as to effectively adhere to the permanent magnet, thus the efficiency in removing the iron particles being improved. For this purpose, when there is supplied a large amount of fluid, the efficiency in removing iron particles may be improved by increasing the rotating speed of the rotating shaft to thereby offset the increment of fluid supply, whereby even in the event that the amount of fluid supplied is increased, a high iron particle removing efficiency can be obtained.

BRIEF DESCRIPTION OF THE DRAWINGS

FIG. 2 is a sectional view showing a second embodiment of a transmission employing the fluid supply system of the invention;

FIG. 10A is a longitudinal sectional view showing the construction of a sixth embodiment of a filtering member constituting the fluid supply system of the invention;

FIG. 10B is a cross-sectional view taken along the line indicated by arrows X—X of FIG. 10A;

DETAILED DESCRIPTION OF THE PREFERRED EMBODIMENTS

Figure 1:
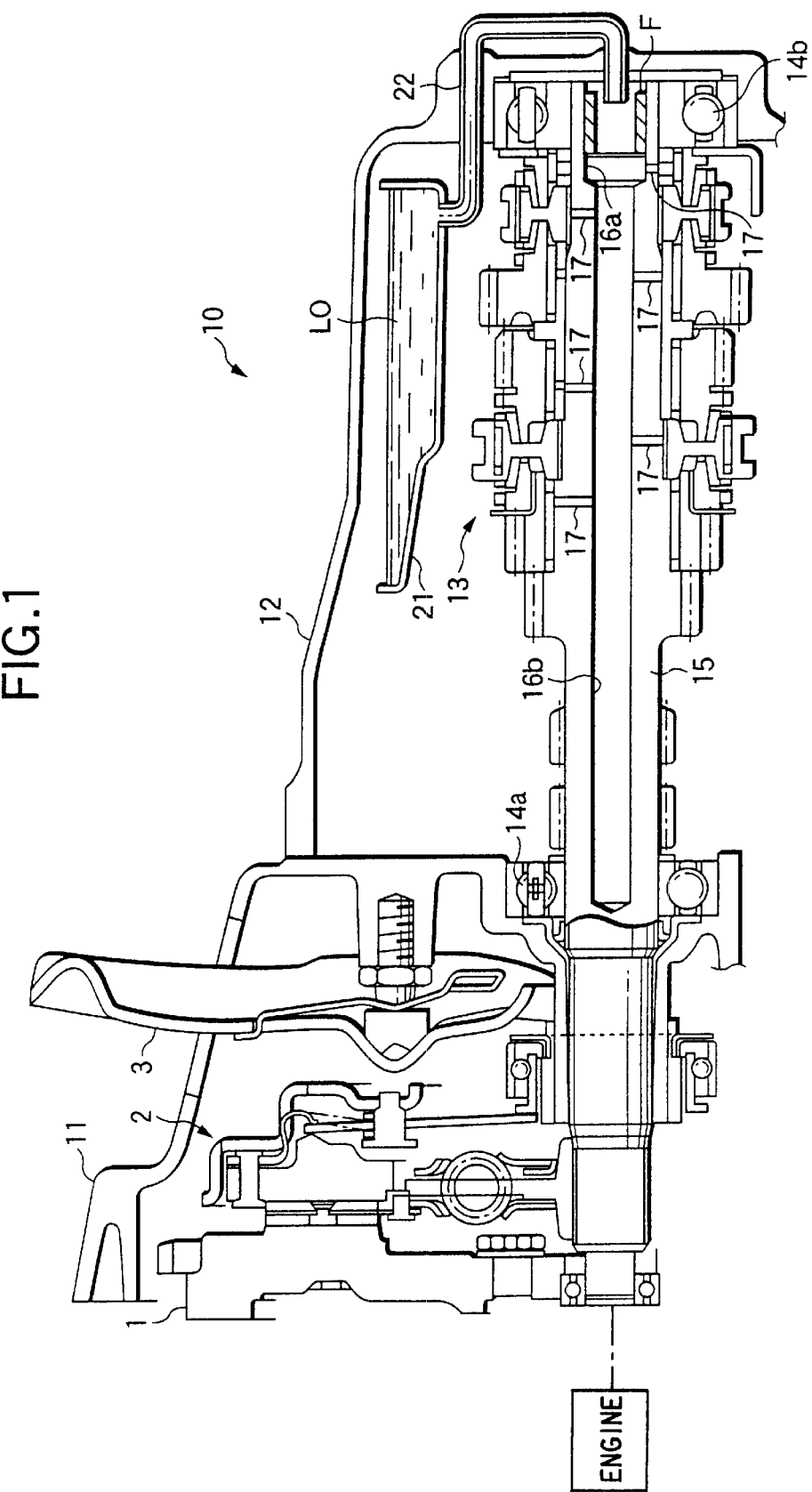
FIG. 1 is a sectional view showing a first embodiment of a transmission employing a fluid supply system of the invention.

A preferred embodiment according to the invention will be described below with reference to the accompanying drawings. First, FIG. 1 shows the construction of a transmission employing a fluid supply system according to the invention. The transmission 10 includes a clutch device 2 disposed within a clutch housing 11 and a transmission device 13 disposed within a transmission housing 12. The clutch device 2 is interposed between a flywheel 1 connected to an engine output shaft and a transmission input shaft 15 of the transmission device 13. The clutch device 2 controls the engagement and disengagement of the engine output shaft with and from the transmission input shaft 15 through the swing of a clutch release lever 3 activated through the operation of a clutch pedal. Disposed on the transmission input shaft 15 are a plurality of drive gears and synchronizer clutch mechanisms which constitute the transmission device 13, and the respective drive gears mesh with driven gears disposed on a transmission countershaft (not shown). Due to this, the output from the engine is changed in speed and transferred to the transmission countershaft via any of the combinations of the drive gears and driven gears when the synchronizer clutch mechanism is activated.

As shown in FIG. 1, a first axial hole 16a and a second axial hole 16a are formed in the transmission input shaft 15 in such a manner that the axial holes 16a, 16b extend coaxially with a core thereof so as to connect with each other through ends thereof and to open at a right end face of the hole so connected. Furthermore, a plurality of lubricating holes 17 are formed in the transmission input shaft 15 which radially extend from the first and second axial holes 16a, 16b to the outer surface of the transmission input shaft 15. A hollow cylindrical filtering member F is disposed in the first axial hole 16a. On the other hand, an oil container 21 is disposed within the transmission housing 12, and when the transmission is driven, lubricating oil LO thrown up by the respective drive and driven gears or the like is constructed to be retained in the oil container 21. A lubricating oil supply tube 22 is disposed so as to extend from the oil container 21 into the hollow space of the filtering member F.

According to this construction, in the transmission 10, while the engine is being driven, the lubricating oil LO thrown up by the respective drive and driven gears or the like and retained in the oil container 21 is sent into the hollow space of the filtering member F through the lubricating oil supply tube 22 and then the lubricating oil so sent to the filtering member F is further supplied to the transmission device 13 on the transmission input shaft 15 from the first and second axial holes 16a, 16b through the lubricating holes 17, whereby the lubricating oil is efficiently and sufficiently supplied to the bearings, synchronizer mesh mechanisms, drive gears or the like which constitute the transmission device 13.

Note that while the oil container 21 is disposed within the transmission housing 12 in this embodiment, a construction conventionally known to the public, which is shown in FIG. 2, may be employed. To be specific, it may be constructed such that lubricating oil LO in an oil tank 12a constituted by a lower portion of the transmission housing 12 is forced to be supplied into the hollow space of the filtering member F through the lubricating oil supply tube 23 using a hydraulic pump P.

In supplying lubricating oil in the transmission 10 constructed as described above, in the event that metal friction particles produced from the gears, bearings or the like are contained in lubricating oil so supplied, the metal friction particles contained in the lubricating oil are supplied into the transmission device 13 together with the lubricating oil, and this may cause a risk that the metal friction particles that have entered the transmission device 13 promote the wear of the bearings, synchronizer mesh mechanisms, drive gears or the like therein or damage the same. To cope with this, iron friction particles contained in lubricating oil LO supplied into the transmission device 13 as described above are designed to be removed by means of the filtering member F when the lubricating oil passes through the hollow space in the filtering member F.

Figure 3A:
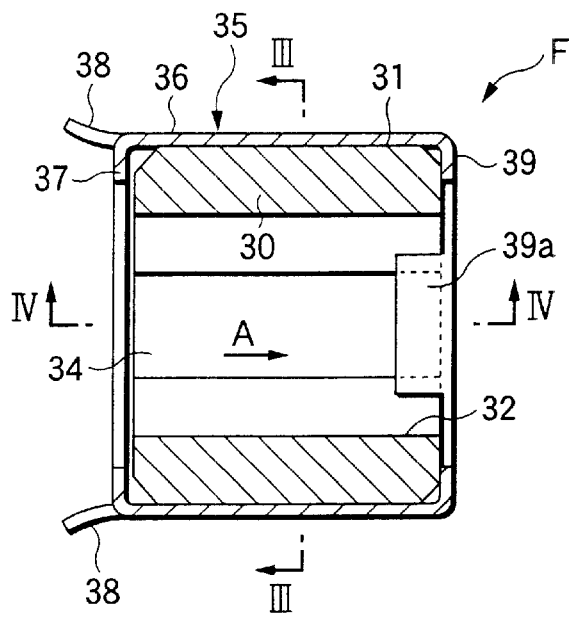
FIG. 3A is a longitudinal sectional view showing the construction of a first embodiment of a filtering member constituting the fluid supply system of the invention.
Figure 3B:
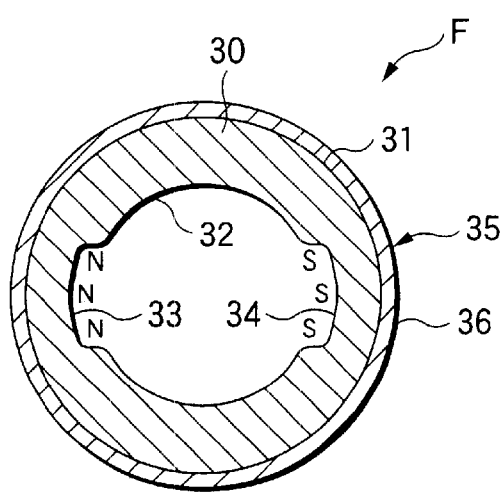
FIG. 3B is a cross-sectional view taken along the line indicated by arrows III—III of FIG. 3A.

The detailed construction of the filtering member F is shown in FIGS. 3A and 3B. The filtering member F includes a hollow cylindrical permanent magnet member 30 and a cover member 35 of a non-magnetic material disposed so as to cover the outer circumference of the permanent magnet member 30. A flow path space is formed in the permanent magnet member 30 in such a manner as to extend therethrough in an axial direction. In addition, a pair of groove portions 33, 34 are formed in the inner circumferential surface 32 of the permanent magnet member 30 in such a manner as to be located diametrically (or to be away from each other at 180 degrees across the central axis of the permanent magnet member 30) and to extend in the axial direction thereof, and the groove portions 33, 34 are magnetized so as to become an N (North) pole and an S (South) pole, respectively.

Figure 4:
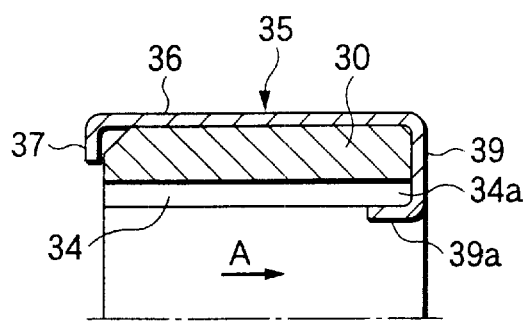
FIG. 4 is a longitudinal sectional view of the first embodiment of the filtering member taken along the line indicated by arrows IV—IV in FIG. 3A.

The cover member 35 is formed so as to have a cylindrical portion 36 for covering the outer cylindrical surface of the permanent magnet member 30, a front flange portion 37 for covering a front end face of the permanent magnet member 30, retaining projections 38 formed so as to extend forward by cutting and erecting portions of the front flange portion 37, a rear flange portion 39 for covering a rear end face of the permanent magnet member 30 and bent portions 39a contiguously connecting with the rear flange portion 39 and bent toward the inner circumferential surface 32 so as to extend forward to thereby cover at least rear portions of the groove portions 33, 34. As is clearly seen from FIG. 4, the rear portion of the groove portion 34 is covered by the bent portion 39a to thereby form a bag-like space 34a. Note that although not shown, similarly the rear portion of the groove portion 33 is covered by the bent portion 39a to thereby form a bag-like space 33a.

The filtering member F constructed as described above is inserted into the first axial hole 16a so as to be mounted therein in such a manner that the rear flange portion 39 is located inwardly. In so inserting the filtering member F into the first axial hole 16a, the retaining projections 38 enter circumferential retaining grooves which are formed in an entrance portion of the first axial hole 16a, whereby the filtering member F is fixedly held within the first axial hole 16a. In this construction, the front flange portion 37 of the cover member 35 is located on the entrance side of the first axial hole 16a, and lubricating oil LO sent in through the lubricating oil supply tube 22 (or 23) flows in a direction designated by an arrow A of FIG. 4.

Thus, the lubricating oil sent through the lubricating oil supply tube 22 flows through the flow path space surrounded by the inner circumferential surface 32 of the permanent magnet member 30 and extending therethrough in the axial direction thereof. Then, iron particles contained in the lubricating oil are attracted by the permanent magnet member 30, whereby the iron particles are removed from the flowing lubricating oil. When this happens, the transmission input shaft 15 to which the filtering member F is attached as described above is driven to rotate by the driving force of the engine, and therefore the filtering member F rotates together with the transmission input shaft 15 to thereby produce a centrifugal force, which acts on the lubricating oil flowing through the flow path space in the interior of the filtering member F. Here, since the specific gravity of the metal particles contained in the lubricating oil OL is greater than that of the lubricating oil, the metal particles are caused to move within the lubricating oil toward the outer circumferential side of the flow path by the centrifugal force to reach the inner circumferential surface 32 of the permanent magnet member 30 where the metal particles are attracted to the inner circumferential surface in an efficient fashion.

In addition, since the magnetic poles are formed in the groove portions 33, 34 of the permanent magnet member 30 such that the magnetic flux of the magnet is converged into the groove portions 33, 34 and since the rotating centrifugal force becomes maximum in the groove bottom portions, the metal particles are attracted mainly to the groove portions due to the synergistic effect. Furthermore, since the rear portions of the groove portions 33, 34 are covered by the bent portions 39a so as to be formed into the back-like spaces 33a, 34a, the metal particles attracted to the groove portions 33, 34 are efficiently retained in the back-like spaces 33a, 34a, and even if the metal particles are exposed to the flowing lubricating oil, it is unlikely that the retained metal particles flow downwardly out of the bag-like spaces. Namely, once attracted to the groove portions and caught in the bag-like spaces, the metal particles continue to be retained as they are.

The magnitude of the centrifugal force acting on the lubricating oil OL passing through the filtering member F increases as the rotating speed of the transmission input shaft 15 or the filtering member F increases, whereby the metal particles can be removed more efficiently. According to this construction, where the rotating speed of the filtering member F is set to increase in response to an increase in supply amount of lubricating oil passing through the filtering member F, metal particles can always be attracted to the groove portions for removal from the flowing lubricating oil with a constant efficiency. For example, in the example shown in FIG. 2, the hydraulic pump P is driven by the engine, and due to this, as the revolution of the engine increases, the amount of lubricating oil supplied from the hydraulic pump P increases. Then, the rotating speed of the transmission input shaft 15 also increases simultaneously so that a certain metal particle removing rate can be maintained.

In view of what has been described heretofore, for example, it may be constructed such that a mechanism for driving the filtering member F to rotate is provided separately from the transmission input shaft 15 so that the rotation of the filtering member F is controlled in response to the amount of lubricating oil flowing through the filtering member F. For example, a motor is provided for driving the hydraulic pump P shown in the example of FIG. 2, and then it is conceived that the rotating speed of the filtering member F is controlled so as to increase in response to an increase in revolution speed of the hydraulic pump P by the motor so provided.

Figure 5:
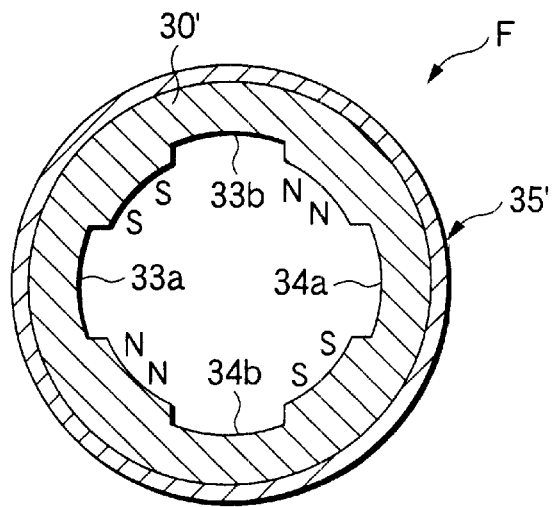
FIG. 5 is a cross-sectional view showing the construction of a second embodiment of a filtering member constituting the fluid supply system of the invention.

The construction of the filtering member F is not limited to what has been described above but the filtering member F may be constructed variously. A variety of constructions of the filtering member F will be described below. First, FIG. 5 shows the construction of a second embodiment of a filtering member F, which is a modification to the aforesaid filtering member F, and therefore the basic construction is identical to that of the first example. This filtering member F is made up of a hollow cylindrical permanent magnet member 30' and a cover member 35' disposed so as to cover the outer circumference of the permanent magnet member 30'. A flow path space is formed in the permanent magnet member 30' in such a manner as to extend therethrough in an axial direction thereof. Formed in the inner circumference of the permanent magnet member 30' are two pairs of groove portions 33a, 34a, 33b, 34b which are located to be away from each other at 90 degrees across an axial center of the permanent magnet member 30' and extend in the axial direction thereof. Portions between the groove portions are magnetized so as to become N poles and S poles, respectively, as shown in the figure. Note that the cover member 35' is formed with bent portions for covering rear portions of the respective groove portions as in the example shown in FIGS. 3 and 4.

Figure 6:
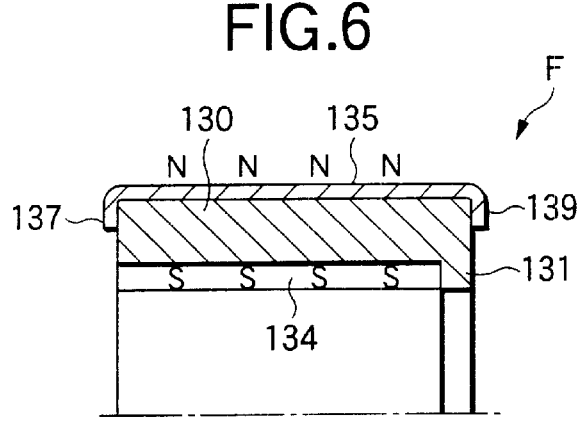
FIG. 6 is a longitudinal sectional view showing the construction of a third embodiment of a filtering member constituting the fluid supply system of the invention.

In the example described above, the cover member is made of a non-magnetic material, but the cover member may be made of a magnetic material such as iron. However, in this case, since the magnetization is also introduced into the cover member, the configuration of the cover member will slightly be different from that of the cover member of the above example. For instance, the construction of a third embodiment of a filtering member F is shown in FIG. 6. The filtering member F in this case has a cover member 135 of a magnetic material for covering a permanent magnet 130, which is magnetized such that an inner circumferential surface is magnetized so as to become an S pole, whereas an outer circumferential surface is magnetized so as to become an N pole. Thus, the cover member 135 is also magnetized to become the N pole. In this case, in the event that front and rear flanges 137, 139 of the cover member 135 are formed to extend as far as the inner circumferential surface side, the N and S poles meet to allow the magnetic flux to conduct to thereby reduce the magnetic force. Therefore, the front and rear flange portions 137, 139 are set to be short. In addition, a groove portion 134 is formed in the inner circumferential surface of the permanent magnet 130, and a rear end portion of the permanent magnet 130 is formed to extend inwardly so as to dam up the lubricating oil at a rear end portion thereof to thereby form an oil reservoir.

Figure 7:
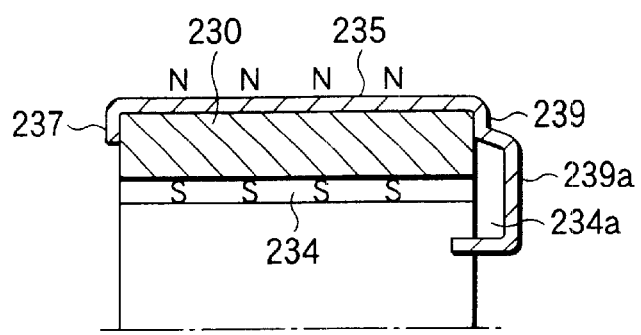
FIG. 7 is a longitudinal sectional view showing the construction of a fourth embodiment of a filtering member constituting the fluid supply system of the invention.

FIG. 7 shows the construction of a fourth embodiment of a filtering member F. This filtering member F also has a cover member 235 of a magnetic material for covering a permanent magnet 230, which is magnetized such that an inner circumferential surface thereof becomes an S pole, whereas an outer circumferential surface thereof becomes an N pole. Thus, the cover member 235 is also magnetized to become an N pole. A front flange portion 237 of the cover member 235 is set to be short to avoid the contact of the N pole with the S pole. On the other hand, a bent portion 239a is formed at a rear flange portion 239 in such a manner as to extend radially inwardly so as to be away from a rear end face of the permanent magnet 230. A groove portion 234 is formed in an inner circumferential surface of the permanent magnet 230, and a rear end portion of the groove so formed is covered by the bent portion 239a so as to form an oil reservoir 234a.

Figure 8A:
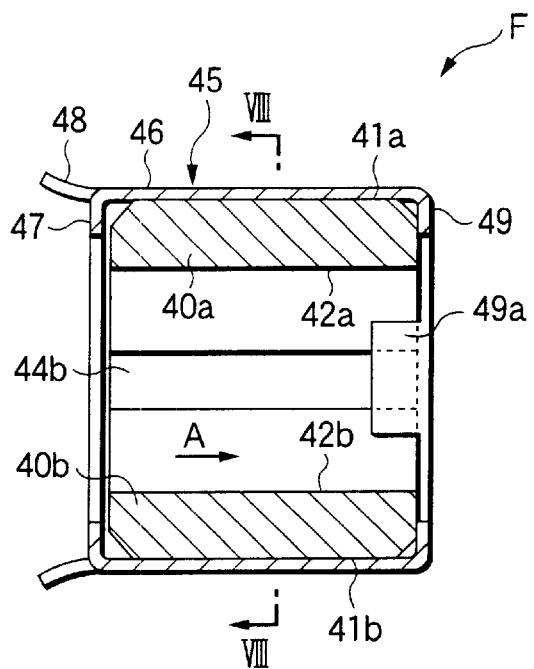
FIG. 8A is a longitudinal sectional view showing the construction of a fifth embodiment of a filtering member constituting the fluid supply system of the invention.
Figure 8B:
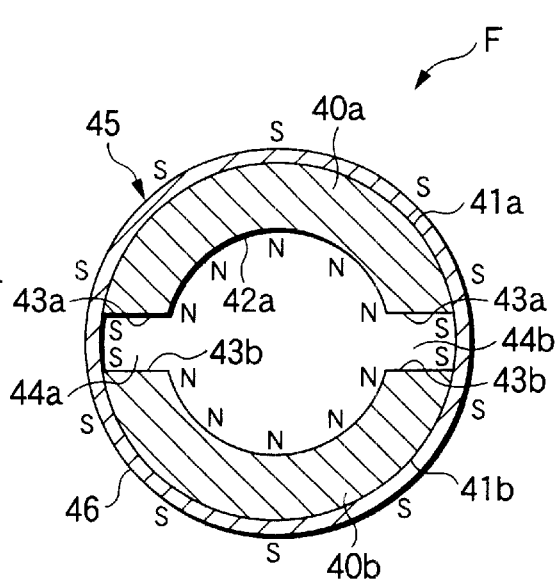
FIG. 8B is a cross-sectional view taken along the line indicated by arrows VIII—VIII of FIG. 8A.

Next, the construction of a fifth embodiment of a filtering member F is shown in FIGS. 8A and 8B. This filtering member F includes a pair of permanent magnet members 40a, 40b which are each formed in such a shape that a hollow cylinder is divided into two and a cover member 45 of a magnetic material. The cover member 45 is substantially the same shape as that of the cover member 35 shown in FIG. 3A, and the pair of half-divided permanent magnet members 40a, 40b is disposed in such a manner as to face each other within a cylindrical portion 46 of the cover member 45. In addition, the two permanent magnet members 40a, 40b are disposed in such a manner as to be spaced away from each other, and a pair of groove portions 44a, 44b are formed between side faces 43a, 43b of the permanent magnet members 40a, 40b so disposed which face each other in such a manner as to be located diametrically (or to be located so as to be spaced away from each other at 180 degrees) and to extend axially.

Note that as well as the aforesaid cover member 35, the cover member 45 is formed so as to have the cylindrical portion 46 for covering outer circumferential surfaces of the permanent magnet members 40a, 40b, a front flange portion 47 for covering front end faces of the permanent magnet members, retaining projections 48 extending forwardly by partially cutting and erecting the front flange portion 47, a rear flange portion 49 for covering rear end faces of the permanent magnet members and bent portions 49a which contiguously connect to the rear flange portion 49 and bent toward inner circumferential surfaces 42 of the permanent magnet members so as to extend forward to thereby cover at least rear portios of the groove portions 44a, 44b. Note that in this filtering member F, too, the rear portions of the groove portions 44a, 44b are covered by the bent portions 49a so as to form bag-like spaces.

The permanent magnet members 40a, 40b are magnetized, respectively, such that outer circumferential surface sides become an S pole and inner circumferential surface sides become an N pole. Since the cover member 45 is made of the magnetic material, the cover member 45 is also magnetized so as to become the S pole in a state in which it contacts the outer circumferential surfaces of the permanent magnet members 40a, 40b. In the filtering member F constructed as described above, the magnetic fluxes of the permanent magnets tend to converge in the groove portions 44a, 44b most intensively, and therefore, metal particles contained in lubricating oil flowing through the flow path space within the filtering member F are attracted to the groove portions 44a, 44b for removal from the lubricating oil in a most efficient fashion. Since the rear portions of the groove portions 44a, 44b are covered by the bent portions 49a so as to form the bag-like spaces thereat, the metal particles attracted to the groove portions 44a, 44b are retained in the bag-like spaces most efficiently. Note that as well as the bent portion shown in FIG. 7, the bent portions 49a are formed so as to be spaced away from the rear end faces of the permanent magnets.

Figure 9:
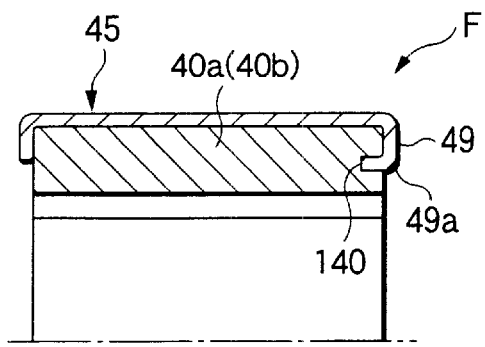
FIG. 9 is a longitudinal sectional view showing a modification to the fifth embodiment of the filtering member above.

In order to fix and hold securely the half-divided permanent magnet members 40a, 40b by the cover member 45 made of the magnetic material, for example, as shown in FIG. 9, retaining grooves 140 may be formed in the rear end faces of the permanent magnet members 40a, 40b, and retaining portions 49a which are formed by bending forwardly distal ends of the rear flange portion 49 of the cover member 45 may be inserted into the retaining grooves 140 so as to be retained therein. Note that in the event that the cover member is made of a non-magnetic material, the flange portions may be formed to extend radially inwardly so that the permanent magnets are covered by the extended flanges in such a manner as to be fixedly held.

Next, a modified embodiment to the above filtering member F (the construction of a sixth embodiment of a filtering member) is shown in FIG. 10. This filtering member F is different from the construction shown in FIG. 8 only in that a pair of projections 46a projecting radially inwardly are provided in a cylindrical portion 46' of a cover member 45', and the other features of the construction are the same as those of the construction shown in FIG. 8. The projections 46a project into the groove portions 44a, 44b so that the projections not only securely fix and hold the pair of permanent magnet members 40a, 40b in the cover member 45' but also set an optimum distance (gap) of the cover member which is magnetized oppositely by the magnetic pole surfaces and the outer circumferential surface of the permanent magnets, for the convergence of the magnetic fluxes of the permanent magnets.

Figure 11:
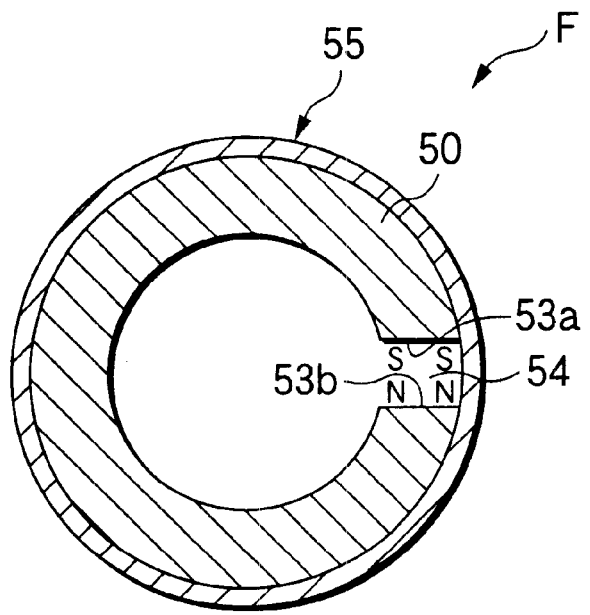
FIG. 11 is a cross-sectional view showing the construction of a seventh embodiment of a filtering member constituting the fluid supply system of the invention.

The construction of a seventh embodiment of a filtering member F is shown in FIG. 11. In this filtering member F, a permanent magnet member 50 which is partially cut away in an axial direction thereof and which has a C-shaped cross section is disposed in a cover member 55 which has substantially the same configuration as those of the aforesaid cover members 35, 45. An axially extending groove portion 54 is formed in the cut-away portion in the permanent magnet member 50, and one axial side face 53a of the permanent magnet member 50 which constitutes the groove portion is magnetized to an S pole, whereas the other axial side face 53b thereof is magnetized to an N pole. According to this construction, the magnetic flux of the permanent magnet converges in the groove portion 54, whereby iron particles contained in lubricating oil are attracted to the interior of the groove portion 54 in an efficient fashion. In this case, a non-magnetic material is to be selected as a material for the cover member for covering the permanent magnet in order to allow no magnetic flux to be conducted between the axial side faces of the permanent magnet member, or a gap is provided between the axial side faces which is wide enough to allow no magnetic flux to be conducted therebetween.

Figure 12:
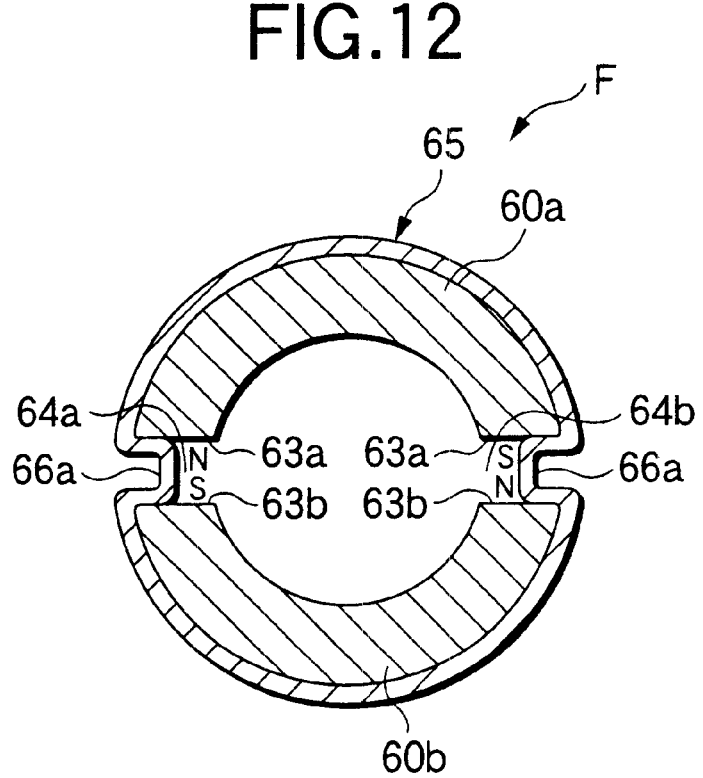
FIG. 12 is a cross-sectional view showing the construction of an eighth embodiment of a filtering member constituting the fluid supply system of the invention.

The construction of an eighth embodiment of a filtering member F is shown in FIG. 12. The construction of this filtering member is similar to the construction shown in FIG. 6, in which a pair of half-divided permanent magnet members 60a, 60b are disposed in a cover member 65. These permanent magnet members 60a, 60b are disposed so as to be spaced away from each other, and groove portions 64a, 64b are formed between axial side faces 63a, 63b of the half-divided permanent magnet members 60a, 60b which face each other. In addition, projecting portions 66a of the cover member 65 project into the groove portions 64a, 64b to thereby fixedly hold the permanent magnet members 60a, 60b. In the construction according to this embodiment, the two permanent magnet members 60a, 60b are each magnetized such that one axial side face becomes an S pole, whereas the other axial side face becomes an N pole, so that the S and N poles face each other within the groove portions 64a, 64b. According to the construction, the magnetic fluxes of the permanent magnets converge in to groove portions 64a, 64b, and therefore, iron particles contained in lubricating oil are attracted to the interior of the groove portions in an efficient fashion. In this case, a non-magnetic material is to be selected as a material for the cover member for covering the permanent magnets in order to allow no magnetic flux to be conducted between the axial side faces of the permanent magnets, or a gap is provided between the axial side faces which is wide enough to allow no magnetic flux to be conducted therebetween.

Figure 13:
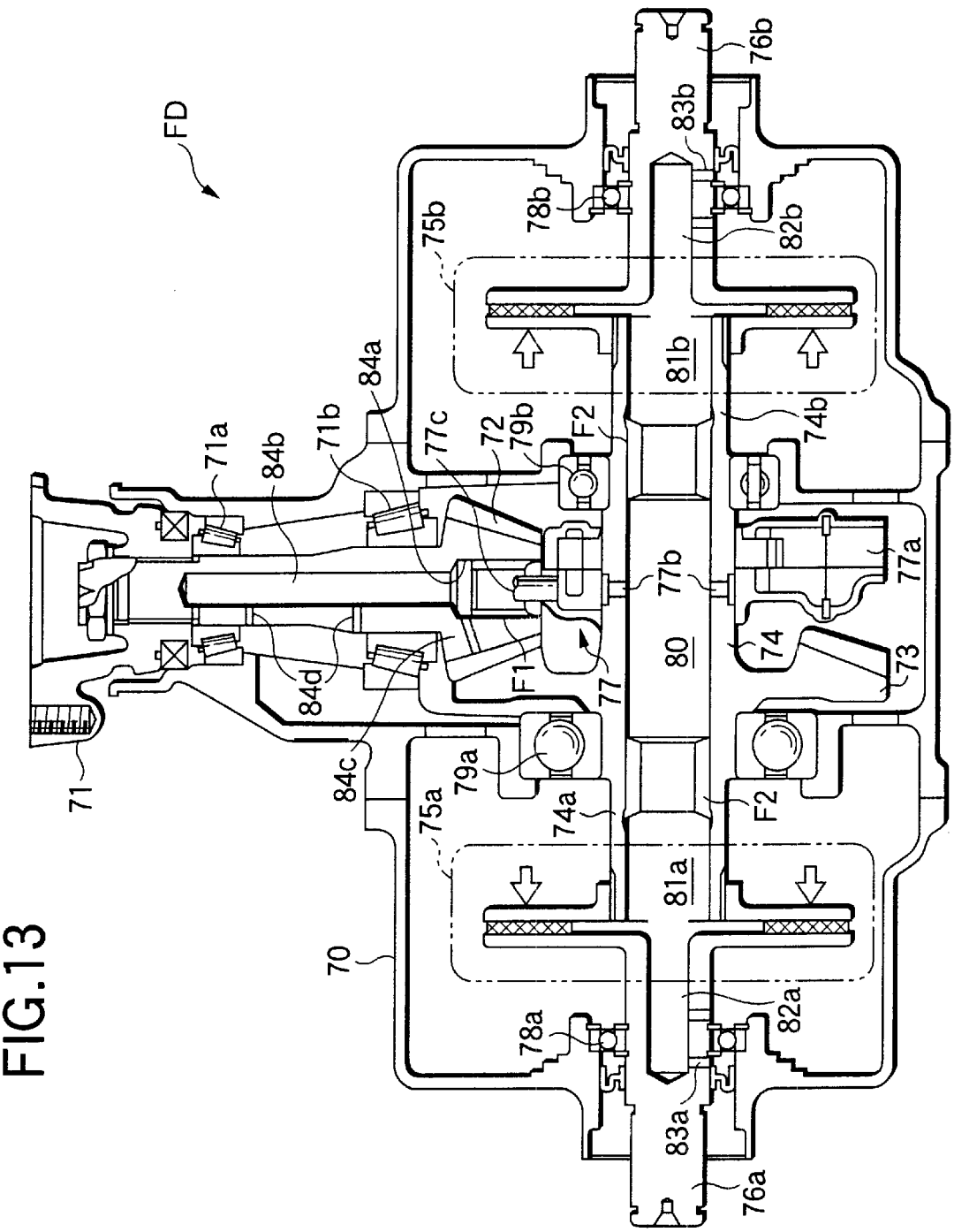
FIG. 13 is a sectional view of a final reduction gear unit employing the fluid supply system according to the invention.

An embodiment is shown in FIG. 13 in which the fluid supply system according to the invention is employed in a final drive. The final drive FD is constructed so as to have within a differential case 70 a final drive mechanism including a pinion gear 72 connecting to a transmission output shaft via a universal joint 71 or the like and a ring gear 73 meshing with the pinion gear 72. The pinion gear 72 is constructed such that a shaft portion thereof is rotatably supported on the bearings 71a, 71b. In addition, an output shaft 74 integrally connects to the ring gear 73, and the output shaft 74 is rotatably supported on bearings 79a, 79b.

Left and right end portions 74a, 74b of the output shaft 74 connect to left and right axle shafts 76a, 76b via left and right differential clutches 75a, 75b, respectively, and the operation of a so-called differential mechanism is designed to be performed through the control of the left and right differential clutches 75a, 75b. Note that the left and right axle shafts 76a, 76b connect to left and right wheels (not shown).

In the final drive FD constructed as described above, for the purpose of forcibly supplying lubricating oil to bearings 71a, 71b, 78a, 78b, and the differential clutches 75a, 75b, for example, a trochoidal lubricating oil pump 77 is disposed on the output shaft 74 which is adapted to be driven through the rotation of the output shaft 74. The lubricating oil pump 77 has a suction port 77a made to open to the interior of the differential case 70, a first discharge port 77b and a second discharge port 77c and is driven through rotation of the output shaft 74, whereby lubricating oil in the differential case 70 is drawn from the suction port 77a and discharged from the first and second discharge ports 77b, 77c.

Here, formed in the pinion gear 72 are first and second lubricating holes 84a, 84b which connect to each other so as to extend in an axial direction of the pinion gear 72 and is made to open to an end face of a pinion gear portion and third and fourth lubricating holes 84c, 84d which establish communications from the lubricating holes 84a, 84b to the surfaces of gear teeth of the pinion gear and the bearings 71a, 71b sides, respectively. In addition, a first filtering member F1 is disposed in the first lubricating hole 84a. The construction of the filtering member F1 is identical to those of the filtering members F shown in FIGS. 3 to 8, and the second discharge port 77c of the lubricating oil pump 77 faces the interior space of the filtering member F1. According to the construction, lubricating oil discharged from the second discharge port 77c by the lubricating oil pump 77 passes through the first filtering member F1 for removing iron particles contained in the lubricating oil and thereafter are supplied to the pinion gear 72 and the bearings 71a, 71b via the first to fourth lubricating holes 84a to 84d for lubricating the surfaces of the gear teeth of the pinion gear 72 and the bearings 71a, 71b.

On the other hand, a fifth lubricating hole 80 is formed in the output shaft 74 in such a manner as to pass therethrough in an axial direction thereof, and the fifth lubricating hole 80 connects to the first discharge port 77b of the lubricating oil pump 77 formed in the output shaft 74. As shown in the figure, a pair of left and right second filtering members F2 is inserted in the fifth lubricating hole 80 from left and right end face sides for disposition therein. Left and right lubricating hole portions 81a, 81b positioned axially outwardly of the respective second filtering members F2 communicate, respectively, with sixth lubricating holes 82a, 82b formed so as to extend axially into the left and right axle shafts 76a, 76b. Seventh lubricating holes 83a, 83b are formed so as to extend from the sixth lubricating holes 82a, 82b to the outer circumferential surfaces of the axle shafts 76a, 76b. Note that the left and right lubricating hole portions 81a, 81b also connect to clutch portions of the differential clutches 75a, 75b.

According to the construction, the lubricating oil discharged from the first discharge port 77b of the lubricating oil pump 77 into the fifth lubricating hole 80 is divided into left and right directions so as to pass through the left and right filtering members F2 for removal of iron particles contained therein. Thereafter, a part of the lubricating oil so supplied is supplied to the differential clutches from the left and right lubricating hole portions 81a, 81b for lubrication thereof, whereas the remaining lubricating oil is supplied to the bearings 78a, 78b through the lubricating holes 82a, 82b and the seventh lubricating holes 83a, 83b for lubrication thereof.

Thus, iron particles contained in the lubricating oil discharged from the first and second discharge ports 77b, 77c of the lubricating oil pump 77 are attracted, respectively, to the first and second filtering members F1, F2 for removal from the lubricating oil. Then, the first filtering member F1 rotates together with the pinion gear 72 and the second filtering members F2 rotate together with the output shaft 74. Therefore, the metal particles contained in the lubricating oil passing through both the first and second filtering members F1, F2 are caused to move toward the outer circumferential sides of the filtering members, whereby they are attracted to the permanent magnet members in an efficient fashion for removal from the lubricating oil. In this construction, the driving rotational speed of the lubricating oil pump 77 is identical to the rotating speed of the output shaft 74 and is proportional to the rotating speed of the pinion gear 72. Due to this, the rotating speeds of the second filtering members F1, F2 are proportional to the rotating speed of the lubricating oil pump 77, whereby as the amount of lubricating oil discharged from the lubricating oil pump 77 increases, the rotating speeds of the filtering members F1, F2 increase, thereby making it possible for the filtering members F1, F2 to attain a certain metal particle removing rate at all timeseven with any rotating speed.

While only certain embodiments of the invention have been specifically described herein, it will apparent that the numerous modification may be made thereto without departing from the spirit and scope of the invention.

As has been described heretofore, according to the invention, since at least the part of the fluid supply passage is formed by the cylindrical internal space of the filtering member, all the fluid supplied from the fluid supply source to the operating device through the fluid supply passage passes through the cylindrical internal space of the filtering member, when iron particles are attracted by the permanent magnet constituting the filtering member, whereby the iron particles are removed from the fluid in an efficient fashion. Furthermore, since the filtering member is disposed in the rotating shaft and rotates together with the rotating shaft, a centrifugal force produced when the rotating shaft rotates acts on the fluid passing through the cylindrical internal space of the filtering member. When this happens, since the specific gravity of the iron particles contained in the fluid is greater than that of the fluid, the iron particles on which the centrifugal force is acting are then caused to move toward an outer circumferential side of the space and hence to approach the permanent magnet and eventually adhere to the permanent magnet to thereby be removed in a more effective fashion.

Furthermore, it is preferable that the fluid supply system is constructed such that at least a pair of groove portions is formed in a cylindrical inner surface of the filtering member in such a manner as to be positioned diametrically across a central axis of the filtering member and to extend in an axial direction, so that the magnetic flux of the permanent magnet converges in the pair of groove portions. According to this construction, the iron particles can be collected into the groove portions so as to adhere thereto for efficient removal from the fluid. Furthermore, it is preferable that downstream portions in a fluid flow direction of the pair of groove portions are dammed so as to form fluid reservoirs on a downstream side of the groove portions. According to this construction, it is unlikely that the iron particles adhering to the interior of the groove portions formed into the fluid reservoirs are forced to separate therefrom by the flow of the fluid so as to flow thereout toward a downstream side of the flow, and moreover, since the flow of the fluid tends to stagnate in the fluid reservoir portions, the iron particles can be caused to adhere to the permanent magnet in a more effective fashion.

In addition, the invention may be constructed such that a rotating speed regulating means is provided for regulating the rotating speed of the rotating shaft, so that the rotating speed regulating means regulates the rotating speed of the rotating shaft in such a manner as to increase the rotating speed of the rotating shaft in response to an increase in volume of the fluid supplied from the fluid supply source. Increasing the rotating speed of the rotating shaft increases the centrifugal force acting on the fluid flowing through the interior of the rotating shaft, and this causes the iron particles in the fluid to move toward the outer circumferential side of the rotating shaft so as to effectively adhere to the permanent magnet, thus the efficiency in removing the iron particles being improved. For this purpose, when there is supplied a large amount of fluid, the efficiency in removing iron particles may be improved by increasing the rotating speed of the rotating shaft to thereby offset the increment of fluid supply, whereby even in the event that the amount of fluid supplied is increased, a high iron particle removing efficiency can be obtained.

What is claimed is:

1. A fluid supply system comprising:
   a fluid supply source;
   an operating device being supplied to the supply of fluid from said fluid supply source;
   a fluid supply passage extending from said fluid supply source to said operating device;
   a rotating shaft formed with an axial hole therein to extend in an axial direction thereof;
   a filtering member having a permanent magnet and a cover member covering said permanent magnet, and disposed within said axial hole of said rotating shaft, said filtering member being formed in to a substantially cylindrical configuration;
   wherein said fluid supplypassage is at least partially constituted by said axial hole within said rotating shaft and a cylindrical internal space formed within said filtering member; and
   wherein said filtering member defines at least one groove portion in a cylindrical inner surface thereof to extend in the axial direction, such that the magnetic flux of said permanent magnet converges in said at least one groove portion.

2. A fluid supply system comprising:
   a fluid supply source;
   an operating device being supplied to the supply of fluid from said fluid supply source;

a fluid supply passage extending from said fluid supply source to said operating device;

a rotating shaft formed with an axial hole therein to extend in an axial direction thereof;

a filtering member having a permanent magnet and disposed within said axial hole of said rotating shaft, said filtering member being formed into a substantially cylindrical configuration;

wherein said fluid supply passage is at least partially constituted by said axial hole within said rotating shaft and a cylindrical internal space formed within said filtering member; and wherein said filtering member defines at least a pair of groove portions in a cylindrical inner surface thereof in such a manner as to be positioned oppositely across a central axis of said filtering member and to extend in the axial direction.

3. A fluid supply system comprising:

a fluid supply source;

an operating device being subjected to the supply of fluid from said fluid supply source;

a fluid supply passage extending from said fluid supply source to said operating device;

a rotating shaft formed with an axial hole therein to extend in an axial direction thereof; and a filtering member having a permanent magnet and disposed within said axial hole of said rotating shaft, said filtering member being formed into a substantially cylindrical configuration, wherein said fluid supply passage is at least partially constituted by said axial hole within said rotating shaft and a cylindrical internal space formed within said filtering member, and wherein said filtering member defines at least a pair of groove portions in a cylindrical inner surface thereof in such a manner as to be positioned oppositely across a central axis of said filtering member and to extend in the axial direction, such that the magnetic flux of said permanent magnet converges in said pair of groove portions.

4. The fluid supply system as set forth in claim 3, wherein fluid reservoirs for interfering with flow of the fluid are defined on a downstream side in a fluid flow direction of said pair of groove portions.

5. The fluid supply system as set forth in claim 3, wherein said filtering member includes a cover member covering said permanent magnet, and said fluid reservoirs are formed by extending radially inwardly said cover member at the downstream side of said pair of groove portions.

6. The fluid supply system as set forth in claim 3, wherein said fluid reservoirs are formed by extending radially inwardly said permanent magnet at the downstream side of said pair of groove portions.

7. The fluid supply system as set forth in claim 3, wherein said permanent magnet comprises a pair of half-divided permanent magnets to cooperatively define the substantially cylindrical configuration, and said pair of half-divided permanent magnets forms said pair of groove portions between side faces thereof opposing to each other and extending in the axial direction.

* * * * *